Figure 1:
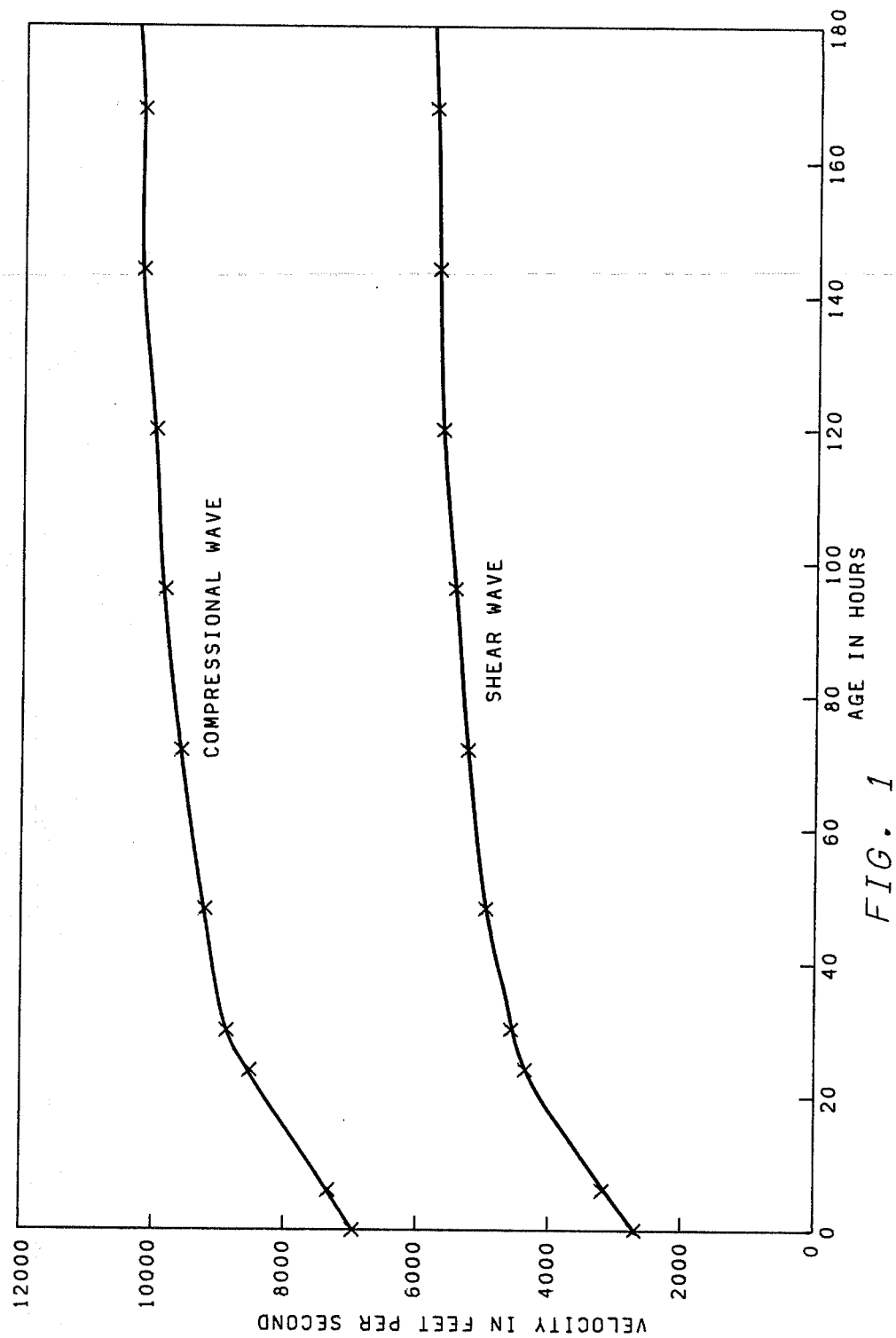

United States Patent [19]

Wiley

[11] 4,254,479
[45] Mar. 3, 1981

[54] SONIC LOGGING METHOD FOR DETERMINING THE NEED FOR SAND CONSOLIDATION TREATMENT

[75] Inventor: Bruce F. Wiley, Bartlesville, Okla.

[73] Assignee: Phillips Petroleum Company, Bartlesville, Okla.

[21] Appl. No.: 22,901

[22] Filed: Mar. 22, 1979

[51] Int. Cl.³ .................................................. G01V 1/40
[52] U.S. Cl. ........................................ 367/35; 367/75; 367/31; 181/105; 175/50
[58] Field of Search .................... 367/25, 31, 35, 75; 181/105; 166/250; 175/40, 50

[56] References Cited

U.S. PATENT DOCUMENTS

| | | | |
|---|---|---|---|
| 2,959,240 | 11/1960 | Schmuck | 181/105 |
| 3,093,810 | 6/1967 | Geyer et al. | 367/31 |
| 3,208,549 | 9/1965 | Alexander et al. | 367/75 |
| 3,252,131 | 5/1966 | Vogel | 367/35 |
| 3,268,858 | 8/1966 | Winter | 367/31 |
| 3,302,164 | 1/1967 | Waters et al. | 367/75 |
| 3,363,719 | 1/1968 | Venghiattis | 367/25 |
| 3,588,800 | 6/1971 | Moore et al. | 367/31 |
| 3,921,126 | 11/1975 | Waters | 166/250 |
| 4,052,613 | 10/1977 | Murphy et al. | 250/259 |
| 4,105,993 | 8/1978 | Grassy et al. | 367/27 |

OTHER PUBLICATIONS

Johnson, "Detection of Liquid . . . Shear Velocities", Feb. 1977, p. 158, Geophysics, vol. 42, #1.

Primary Examiner—Nelson Moskowitz

[57] ABSTRACT

Acoustical logging apparatus is utilized to determine the need for consolidation treatment of an oil-bearing sand formation prior to production and preferably prior to the removal of the drill rig. The relative energy levels and/or the relative velocities of the compressional and shear waves are measured and the ratio of the compressional energy to shear energy and/or the ratio of compressional velocity to shear velocity is utilized to provide an indication of the need for sand consolidation treatment.

6 Claims, 2 Drawing Figures

SONIC LOGGING METHOD FOR DETERMINING THE NEED FOR SAND CONSOLIDATION TREATMENT

This invention relates to acoustical well logging. In a particular aspect, this invention relates to method and apparatus for determining if there is a need for consolidation treatment of an oil-bearing formation.

Oil and gas are produced from underground formations through well bores drilled down from the surface to penetrate the formation. Some hydrocarbons are contained in the pores of consolidated rocks. When these hydrocarbons are produced through the well bore, they are generally free of sand. However, many wells produce fluid from hydrocarbon-bearing formations which are unconsolidated; that is, the sand particles are not strongly attached to each other, and, when the fluid is produced, it tends to carry sand with it. This sand can cause extremely serious damage to well equipment.

Oil wells producing from unconsolidated sand reservoirs are treated with thermosetting plastics or other cementing agents in order to stabilize or consolidate the formation in the vicinity of the well bore. In the past, the need for consolidation treatment of a sand reservoir has generally not been known until after production has started. The need is usually evidenced by the production of sand together with the oil. Corrective procedures then include production shutdown, removal of production equipment, and installation of well cementing equipment. The installing of the well cementing equipment requires that some type of rig such as a drilling rig must be installed. All of these corrective procedures involve considerable expense which could be avoided if the need for the consolidation treatment of the sand reservoir could be determined before the drilling rig was removed from the borehole and the production equipment installed. The drilling rig could be utilized to install the well cementing equipment and the expensive procedures of production shutdown and removal of production would be avoided.

It is thus an object of this invention to utilize sonic well logging apparatus to determine if there is a need for consolidation treatment of a sand reservoir preferably before the drilling rig is removed from the borehole.

In accordance with the present invention, a method is provided whereby, after the borehole has been drilled but before the drilling rig is removed, sonic well logging apparatus is utilized to provide measurements of the response of the formation surrounding the borehole to compressional waves of sound and shear waves of sound. Sonic waves produced by a sonic transmitter associated with the well logging apparatus are received by a sonic receiver associated with the well logging apparatus. The relative energy levels of the compressional and shear waves and/or the relative velocities of the compressional and shear waves are measured. If the ratio of the velocity of the compressional wave to the velocity of the shear wave is greater than approximately 2.0, then sand consolidation is generally needed. Also, a conducted compressional wave energy 25 dB greater than the conducted shear wave energy is also indicative of the need for sand consolidation. In this manner, an early determination of the need for sand consolidation may be made and considerable expense may be avoided by utilizing standard techniques to consolidate the oil-bearing sand formation before the drilling rig is removed and production is begun.

Figure 2:
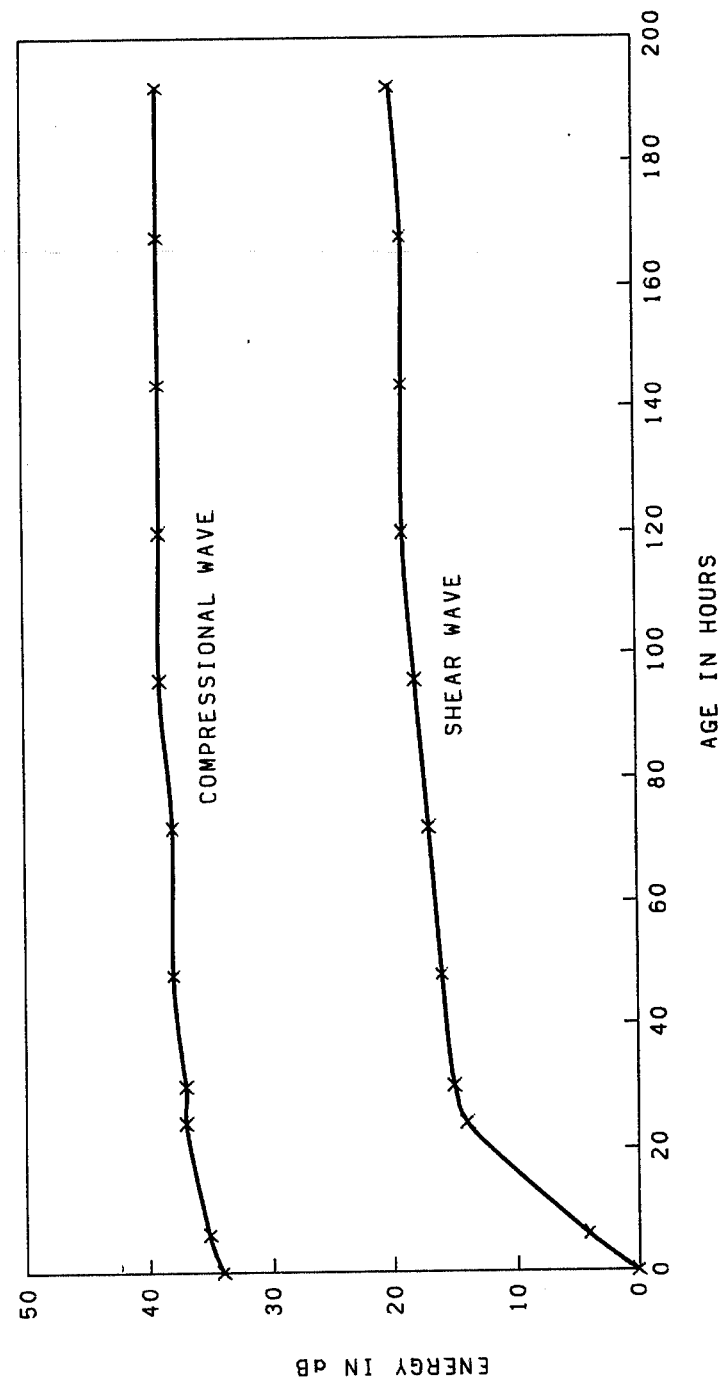

Other objects and advantages of the invention will be apparent from the foregoing description of the invention and the appended claims as well as from the following detailed description of the invention and the description of the drawings in which:

FIG. 1 is a plot of the compressional wave velocity and the shear wave velocity versus time for a sand cement mixture which was allowed to harden or become more consolidated over a period of time; and FIG. 2 is a plot of compressional wave energy and shear wave energy versus time for the sand cement mixture utilized to obtain the plot illustrated in FIG. 1.

In a borehole situation, the attenuation of the shear wave in unconsolidated sand will be much greater than for a shear wave in a borehole penetrating a consolidated sand formation. However, the compressional waves will not be affected to the extent that the shear wave is affected by the difference between unconsolidated sand and consolidated sand. In like manner, the velocity of the shear wave is greatly affected by the consolidation of the sand while the velocity of the compressional wave is not affected to the same extent.

When a drilling bit penetrates an unconsolidated sand, grain contact pressures are relieved by lateral flow or movement of sand grain towards the hole. As a result, an annular grain contact pressure gradient zone forms about the borehole. Near the wall of the hole, the sand will have a grain contact pressure about equal to the hydrostatic pressure differential across the mud cake in the borehole. Progressing back into the formation, grain contact pressure will increase until the undisturbed lithostatic pressure is reached. This distance will depend on such factors as depth, drilling mud characteristics, drilling rate, formation permeability and porosity, grain size and shape, and other similar factors. The disturbed zone will generally encompass that volume of the formation which tends to influence presently configured sonic logging systems. This loss of static pressure in the zone of investigation will enhance attenuation of shear energy relative to compressional energy and will also cause greater variations in the velocity of the shear wave relative to the velocity of the compressional wave. These differences tend to emphasize the presence of unconsolidated sand and provides a means for determining the need for consolidation treatment of the sand before production is begun.

In the present invention, acoustical well logging apparatus such as that illustrated in U.S. Pat. Nos. 3,447,127 or 3,734,233 is utilized, after the borehole is drilled but before the drilling rig is removed, to measure the response of the formation of rock surrounding a borehole to compressional waves of sound and shear waves of sound. The compressional waves of sound travel faster than shear waves of sound waves and will arrive at the sonic receiver associated with the acoustic logging apparatus before the shear waves of sound arrive. The direction of particle motion for the compressional wave is in the direction of propagation. The shear wave will arrive at the receiver at a period of time later than the first arrival of the corresponding compressional waves. The direction of particle motion for a shear wave is transverse to the direction of propagation. As has been previously stated, the extent of the consolidation of the sand surrounding the bore hole has a greater effect upon the shear wave than upon the compressional wave. Because of this property, a comparison of either the energy or velocity of the compressional wave to the energy or velocity of the shear wave provides an indication of the extent of the consolidation of the sand reservoir.

The received energies of the compressional and/or shear waves and the velocities of the compressional and shear waves are measured by the acoustical well logging apparatus. If the relative energies of the compressional and shear waves are being utilized to determine the need for sand consolidation, the received energy associated with the compressional wave is divided by the received energy associated with the shear wave. If the compressional energy is approximately 25 dB greater than the shear wave energy, then there is a need for consolidation treatment of the sand reservoir.

If the relative velocities of the compressional wave and shear wave are being utilized to determine the need for consolidation of the sand reservoir, then the velocity of the compressional wave is divided by the velocity of the shear wave. If the ratio of the compressional wave velocity to shear wave velocity is greater than approximately 2.0, then there is a need to consolidate the sand reservoir surrounding the borehole.

The following example is presented to further illustrate the present invention.

EXAMPLE

An artifical sediment was formed by mixing together 500 grams of Ottawa sand, 50 grams of Portland cement, and water. When thoroughly mixed, the artificial sediment was placed into a consolidator having a 4 inch inside diameter compaction cell with permeable platens, top and bottom, and a hydraulic press for loading the platens. Ultrasonic transducers set in the platen faces, as shown in U.S. Pat. No. 3,995,501, were utilized to both transmit and receive compressional and shear acoustic signals. After loading in the compaction cell, the artificial sediment was subjected to an initial loading of $6.89 \times 10^7$ Pa. The pressure was next reduced to $3.45 \times 10^7$ Pa and then to $6.89 \times 10^6$ Pa where it was held for about 7 days. During this period, the setting of the cement changed the specimen from compacted mixtures of loose sand grains and cement particles to an indurated, but quite friable sandstone. For all practical purposes, porosity, density, water saturation, grain contacts and frame pressure remain constant during the sandstone development. The thickness of the compacted artificial sediment was $35.23 \pm 0.2$ mm. Sufficient water was added to yield a water saturation of approximately 100% after compaction. A water saturation of 100% compares closely with the physical characteristics of the sediment surrounding a borehole.

The compressional and shear wave velocities, as well as the ability of the specimen to conduct the energy of the compressional and shear waves were periodically measured. FIG. 1 illustrates the effect of the consolidation or setting up of the specimen on the velocity of the shear wave and compressional wave. FIG. 2 illustrates the effect of the consolidating or setting up of the specimen on the ability of the specimen to transmit the energy associated with the compressional and shear waves.

The effect of the degree of consolidation on the compressional to shear velocity ratios is illustrated by FIG. 1 At the age of 30 minutes, this ratio for the sand cement mixture is 2.48; at 20 hours, the ratio is 2.01; and at 160 hours, the ratio is down to 1.76. It is known that specimen incorporating Portland cement becomes well consolidated after a period of approximately 24 hours and only minor consolidation occurs thereafter. It is thus felt that if the compressional to shear velocity ratio is greater than approximately 2.0 there is a need for consolidation of the sand formation surrounding the borehole.

The effect of unconsolidation is even more dramatic for shear and compressional wave energies than for shear and compressional wave velocities as is illustrated in FIG. 2. Substantially no shear wave energy is transmitted when the specimen is totally unconsolidated. In contrast, unconsolidation has very little effect upon the transmission of the energy associated with the compressional wave. The shear wave energy conducted by the specimen increases dramatically for the first 24 hours during which the major portion of the consolidation of the specimen is occurring. A comparison of the compressional wave energy conducted and the corresponding shear wave energy conducted thus provides a very good indication of the consolidation of the sand reservoir. In general, if the compressional wave energy conducted is approximately 25 dB greater than the corresponding shear wave energy conducted then the sandstone reservoir is considered unconsolidated and there is a need for consolidation of the sand reservoir before production begins.

While the invention has been described in terms of the presently preferred embodiment, reasonable variations and modifications are possible by those skilled in the art, within the scope of the described invention and the appended claims. Variations such as using a different compressional wave to shear wave velocity ratio or a different ratio of compressional wave energy conducted to shear wave energy conducted are within the scope of the present invention.

I claim:

1. An acoustic well logging method for determining the need for consolidation of a formation surrounding a borehole comprising the steps of:

generating an acoustical wave at a point within said borehole;

receiving at least the compressional waves and shear waves, resulting from said acoustical wave, at a point spaced from the point of generation of said acoustical wave;

measuring the velocity of said compressional wave; measuring the velocity of said shear wave; and utilizing a comparison of the compressional wave velocity and the shear wave velocity to determine the need for consolidation of said formation.

2. A method in accordance with claim 1 wherein the need for consolidation of said formation is established by a compressional wave velocity to shear wave velocity ratio greater than or equal to approximately 2.0.

3. A method in accordance with claim 1 wherein the determination of the need for consolidation of said formation is made after the borehole is drilled but before the drilling rig is removed and production is begun.

4. An acoustical well logging method for determining the need for consolidation of a formation surrounding a borehole comprising the steps of:

generating an acoustical wave at a point within said bore hole;

receiving at least the compressional waves and shear waves, resulting from said acoustical wave, at a point spaced from the point of generation of said acoustical wave;

measuring the received energy associated with said compressional wave;

measuring the received energy associated with said shear wave; and utilizing a comparison of the received energy associated with said compressional wave and the received energy associated with said shear wave to determine the need for consolidation of said formation.

5. A method in accordance with claim 4 wherein the need for consolidation of said formation is established when the received energy associated with said compressional wave is greater than the received energy associated with said shear wave by a factor of at least approximately 25 dB.

6. A method in accordance with claim 4 wherein the determination of the need for consolidation of said formation is made after the borehole is drilled but before the drilling rig is removed and production is begun.

* * * * *